Nov. 8, 1960  S. DOMESHEK  2,958,957
STEREO RANGING ATTACHMENT FOR LARGE TRANSPARENCY PROJECTOR
Filed March 30, 1955  2 Sheets-Sheet 1

INVENTOR.
SOL DOMESHEK
By Wilson R. Maltby
Louis B. Applebaum
ATTORNEYS

Nov. 8, 1960 S. DOMESHEK 2,958,957
STEREO RANGING ATTACHMENT FOR LARGE TRANSPARENCY PROJECTOR
Filed March 30, 1955 2 Sheets-Sheet 2

INVENTOR.
SOL DOMESHEK
By Wilson R. Maltby
Louis B. Applebaum
ATTORNEYS

United States Patent Office 2,958,957
Patented Nov. 8, 1960

2,958,957

STEREO RANGING ATTACHMENT FOR LARGE TRANSPARENCY PROJECTOR

Sol Domeshek, 160 S. Middleneck Road, Great Neck, N.Y.

Filed Mar. 30, 1955, Ser. No. 498,124

3 Claims. (Cl. 35—25)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in training devices, and more particularly pertains to means for teaching individuals to judge distances between a point of observation and an object being observed.

Accurate distance estimation is not a highly developed skill among the general population, yet it is important to proper performance of a wide variety of functions. For example, such accurate estimation is essential in the performance of tactical duties of military personnel, and is of value to farmers, sportsmen and personnel working outdoors. The instant invention is adapted to be used in group training to help improve the accurate judgment of distances by trainee observers, in addition to providing basic training to groups of trainees on how to range stereoptically. The invention is of particular value to the armed forces in training military personnel to estimate range quickly and correctly, since the lives of troops and the successful execution of a mission can depend upon such accurate judgment.

The inventive concept is capable of being used with various projection systems, of which the overhead projector form is used merely for illustrative purposes. In addition, the anaglyph or polaroid or prismatic stereo images are overlapped completely and thus can be projected by a monocular optical system and can employ the simple type of parallax cam disclosed to measure distances in the projected stereo scene.

The principal object of the invention is to provide means to train groups to judge distances accurately.

Another object is to provide means to train simultaneously a number of people in ranging with a stereo-reticle.

Still another object is to simplify the method of providing stereo presentations and stereo ranging reticles to groups of people simultaneously so that the cost of maintenance of equipment to accomplish these effects is decreased.

Still another object is to provide means to demonstrate the fact that not only does a stereoscopic picture appear to contain depth, but that this depth is capable of being measured in terms of distance.

A further object is to provide preliminary training in range-finder operations.

Significant features of the invention include the use of a cam, linkage, or cable actuated reticle which may be calibrated to indicate range; the use of a simplified pivot plate for the manipulation of the stereo ranging device; the use of a monocular optical system for the projection of a pair of stereo transparencies as well as the pair of stereo-reticles used to measure distances in depth; and the provision of a convenient means for moving the stereo-reticle so that the entire field of view of the stereo scene can be scanned and so that correct angular orientation is maintained between the stereo-reticle and the base line of the stereo scene.

Other objects and many of the attendant advantages of this invention will be readily appreciated as the same becomes better understood by reference to the following detailed description when considered in connection with the accompanying drawings wherein.

Figure 1:
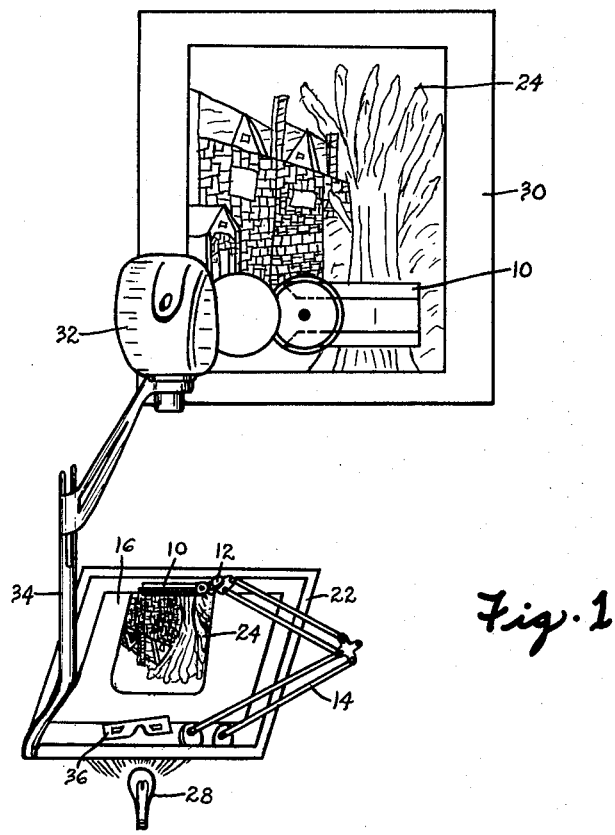
Fig. 1 is an elevation of a transparency projector that can be used with this invention with the ranging means of the invention in position.

Stereoscopic ranging assembly is attached adjustably to clamping knob 12 of parallel motion means 14. The parallel motion means is fixed to transparency holding frame member 16 at 18 and is adapted to move longitudinally and vertically in parallel relation to the sides of frame member 16 by means of pivot connections 20. Frame member 16 is mounted on a suitable support 22, illustrated schematically in Fig. 1, and retains transparencies 24 by means of clips 26, or the like. Transparencies 24 are designed to provide stereoscopic or three-dimensional scenes. These transparencies comprise either a pair of anaglyphs, a pair of polarized transparencies (vestograph), or prismatic free-vision stereoscopic pictures, in each case projected upon a screen adapted to the particular type of picture used.

In the articulation shown, transparency 24 is illuminated from beneath the support at 28 and is projected in magnified form on screen 30 by means of the projector or objective element 32. Objective element 32 is supported on post 34, extending vertically from the support base 22. The conventional sterescopic viewing eye-piece 36 appropriate to the particular stereo system is used to allow the observer to see the three-dimensional effect. Frame 16 is secured against movement by means of straps 38, riveted at 40 to the frame and including depending pins 41, adapted to be received in suitable holes (not shown), in the support base 22.

Figure 3:
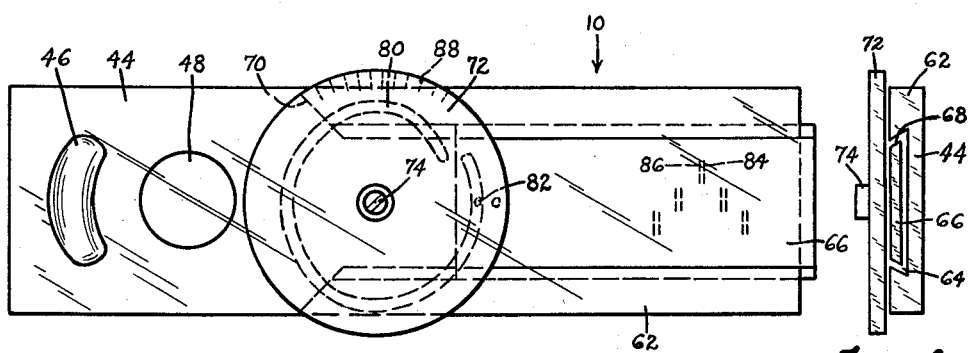
Fig. 3 is a plan view of the ranging device per se.
Figure 4:
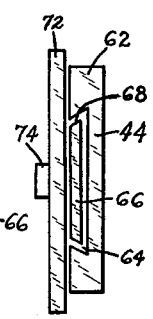
Fig. 4 is an end view of the ranging device.
Figure 2:
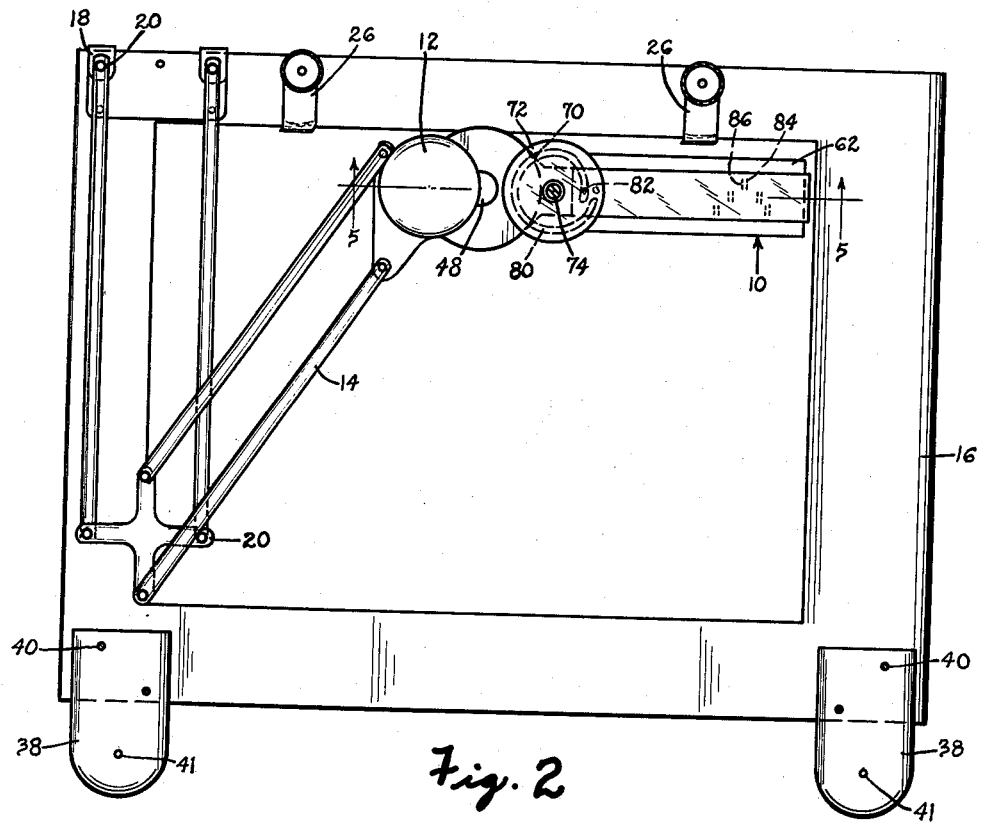
Fig. 2 is a plan view of the transparency holding means and the ranging device.
Figure 5:
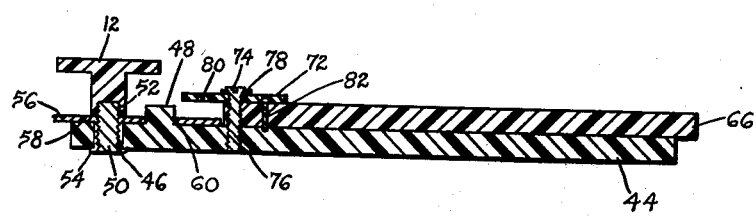
Fig. 5 is a section taken on line 5—5 of Fig. 2, showing details of the ranging device.

Ranging assembly 10 is illustrated in detail in Figs. 3, 4 and 5 and comprises a base member 44 with a curved slot 46 and a pivot post 48. Knob 12 on parallel motion means 14 contains a depending pin 50, threaded along its length 52, and adapted to extend through arcuate slot 46 in base means 44. Rivet head 54 retains pin 50 on base member 44. Plate 56 extends laterally from free ends of parallel motion means 14 to overlie a portion of base 44 and contains aperture 58, through which pin 50 extends, and an opening 60, to receive the free end of pivot post 48. When knob 12 is loosened by turning on pin 50, ranging assembly 10 is angularly adjusted by pivoting movement on post 48, the limit of movement being determined by slot 46.

Base member 44 retains slide rails 62 in parallel spaced relation. Rails 62 are undercut or grooved at 64, at an angle from the inner edge thereof towards the periphery of base 44 (see Fig. 4). In this manner, a generally U-shaped track is provided to receive therein, in sliding relation, a wedge-shaped reticle slide 66. The tapered sides 68 of slide 66 are complementary to grooves 64 on rails 62. In this manner, slide 66 is retained within the slide rails and cannot be displaced accidentally.

Slide rails 62 extend along the upper edge of base 44 and terminate in close proximity to the peripheral edge of plate 56. If desired, the ends 70 of rails 62 are beveled to allow close proximity to the periphery of plate 56.

Cam disk or plate 72 is rotatably held on screw 74, threaded at 76 into base member 44 and is provided with bushing 78, to prevent binding. Spiral cam groove 80, describing a curve of continuously diminishing radius, is cut into but not through the bottom surface of cam disk 72. Follower pin 82 extends upwardly from the rear of reticle slide 66 and into groove 80. As cam disk 72 is rotated, pin 82 rides in groove 80, thereby causing reticle slide 66 to move longitudinally to set the proper parallactic distance for the pair of stereo-recticles. Reticle 84 is etched into transparent base member 44, while reticle 86 is etched into transparent reticle slide 66. Rotation of cam 72 sets reticle 86 with respect to reticle 84 so that the proper parallactic distance is obtained for the particular scene depths sighted. This provides the correct range, and the reticle appears to hover in space at the same distance from the observer as the target sighted appears. The reticles are, corresponding to the transparencies, either anaglyph, polaroid or prismatically projected, in order to allow movement of stereoscopic depth in the three-dimensionally projected scene.

Suitable indices 88 or indicating means, calibrated to give a direct distance reading can be supplied to the cam plate. When the reticle members are in alignment with a target, actual range can then be read.

In use, frame 16 is positioned on base 22 for the projection of the stereoscopic transparencies on screen 30, which is a screen adapted to the particular stereo system employed. Ranging assembly 10, affixed to parallel motion means 14, is aligned with the base line of the stereo transparencies so that the ranging assembly 10 always moves in a plane parallel to the plane of the transparencies and to the base line of the transparencies.

Ranging assembly 10 is projected on screen 30 to overlie the selected point to be ranged on in the transparencies. Cam disk 72 is rotated on post 74, causing pin 82 to ride in groove 80 and thereby slide reticle member 66 longitudinally to align reticles 84 and 86 stereoscopically. The reticle now appears to hover over the object at the same distance from the observer as the target.

The range may now be read directly on cam disk 72.

A simple yet effective stereoscopic teaching device is thereby obtained. The invention has wide use in teaching both children and adults to estimate distance accurately.

The device is adapted readily for combination with standard projection equipment and is capable of use in mass teaching and in demonstration of stereoscopic pictures and stereoscopic effects. The invention is of general scope and, of course, is not limited to the embodiment described by way of illustration. Other forms of the inventive concept readily occur. For example, a field mask, formed as an open ended envelope and provided with overlying pairs of stereo scenes, could be used to project a monocular optical system.

Obviously many modifications and variations of the present invention are possible in the light of the above teachings. It is therefore to be understood that within the scope of the appended claims the invention may be practiced otherwise than as specifically described.

I claim:

1. A ranging device for judging distance comprising a frame member adapted to retain a stereoscopic transparency, parallel motion means secured to and overlying said frame member, a transparent base member having a reticle thereon secured to said parallel motion means, a transparent slide member slidably retained within said transparent base, said slide member containing a reticle which is adapted to align with said base member reticle to appear to hover over an object, and adjusting means secured to said base member and to said slide member to set parallactic distances, wherein said base member includes a cam plate, a spiral cam groove of diminishing radius contained in said cam plate, said spiral groove representative of the distances from one observer to the object, and follower means extending from one end of said slide member and received in said spiral cam groove, whereby rotation of said cam plate causes the slide member to move longitudinally and to set the parallactic distance for the stereo-recticles.

2. A ranging device for judging distance comprising a frame member adapted to retain a stereoscopic transparency, parallel motion means secured to and overlying said frame member, a transparent base member having a reticle thereon secured to said parallel motion means, a transparent slide member slidably retained within said transparent base, said slide member containing a reticle which is adapted to align with said base member reticle to appear to hover over an object, adjusting means secured to said base member and to said slide member to set parallactic distances, wherein said base member includes a cam plate, a spiral cam groove of diminishing radius contained in said cam plate, said spiral groove representative of the distance from the observer to the object, follower means extending from one end of said slide member and received in said spiral cam groove, whereby rotation of said cam plate causes the slide member to move longitudinally and to set the parallactic distance for the stereo-reticles, and scale means calibrated to give a direct distance reading of actual range on said cam plate.

3. A ranging device for judging distance comprising a frame member adapted to retain a stereoscopic transparency, parallel motion means secured to and overlying said frame member, a transparent base member having a reticle thereon secured to said parallel motion means, a transparent slide member slidably retained within said transparent base, said slide member containing a reticle adapted to appear to hover over an object, cam plate means containing distance indicating means thereon coupled to said base member, and follower means fixedly secured to said slide member and slidably retained in said cam plate means whereby said slide member moves with said cam plate so that said distance indicating means correctly indicate the distance from an observer to the object.

References Cited in the file of this patent

UNITED STATES PATENTS

| 1,460,732 | Pulfrich | July 3, 1923 |
|---|---|---|
| 1,756,062 | Holst | Apr. 29, 1930 |
| 1,816,181 | Eliel | July 28, 1931 |
| 1,921,630 | Mechau | Aug. 8, 1933 |
| 2,104,778 | Talley | Jan. 11, 1938 |
| 2,121,255 | Miller | July 21, 1938 |
| 2,194,682 | Abrams | Mar. 26, 1940 |
| 2,352,101 | Hutter | June 20, 1944 |
| 2,420,633 | Wittle et al. | May 13, 1947 |
| 2,424,088 | Furman et al. | July 15, 1947 |
| 2,637,848 | Cunningham | May 5, 1953 |